US 11,341,498 B2

(12) United States Patent
Ji et al.

(10) Patent No.: US 11,341,498 B2
(45) Date of Patent: *May 24, 2022

(54) METHOD AND DEVICE FOR END-USER VERIFICATION OF AN ELECTRONIC TRANSACTION

(71) Applicant: AT&T Intellectual Property I, L.P., Atlanta, GA (US)

(72) Inventors: Lusheng Ji, Randolph, NJ (US); Donald John Bowen, Madison, NJ (US); Thomas Killian, Mendham, NJ (US); David Kormann, Morristown, NJ (US); Robert R. Miller, II, Convent Station, NJ (US); Norman L. Schryer, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,034

(22) Filed: Jan. 29, 2019

(65) Prior Publication Data
US 2019/0156339 A1 May 23, 2019

Related U.S. Application Data

(63) Continuation of application No. 14/635,624, filed on Mar. 2, 2015, now Pat. No. 10,229,410, which is a (Continued)

(51) Int. Cl.
G06Q 20/38 (2012.01)
G06Q 20/40 (2012.01)
(Continued)

(52) U.S. Cl.
CPC ..... *G06Q 20/4014* (2013.01); *G06Q 20/3229* (2013.01); *G06Q 20/382* (2013.01);
(Continued)

(58) Field of Classification Search
None
See application file for complete search history.

(56) References Cited

U.S. PATENT DOCUMENTS 5,241,594 A 8/1993 Kung
5,870,723 A 2/1999 Pare et al.
(Continued)

FOREIGN PATENT DOCUMENTS

GB 2393806 A * 4/2004 ............ G06Q 20/04

OTHER PUBLICATIONS

W. Diffie and M.E. Hellman, "New directions in cryptography," IEEE Transactions on Information Theory 22 (1976), pp. 644-654.

*Primary Examiner* — Fatoumata Traore
(74) *Attorney, Agent, or Firm* — Guntin & Gust, PLC; Jay Anderson

(57) ABSTRACT

The present invention provides methods and apparatuses for verifying that a transaction is legitimate. The methods and apparatuses use protected memory space, such as kernel space of an operating system, or a separate memory space, such as is available on a SIM card of a cellular phone. The method of the invention proceeds by creating a transaction identification string (TID) and associating the TID with a transaction. The TID contains data relevant to or associated with the transaction and is typically readable by an end-user. The transaction is then interrupted until a user responds in the affirmative to allow completion of the transaction. Methods and devices used in the invention are particularly well suited to M-commerce, where transactions originating from a device are typically recognized by a merchant as coming from the owner of the device without further authentication.

20 Claims, 7 Drawing Sheets

Related U.S. Application Data continuation of application No. 12/072,739, filed on Feb. 28, 2008, now Pat. No. 8,996,867.

(51) Int. Cl.
*H04L 9/40* (2022.01)
*G06Q 20/32* (2012.01)
*G07F 7/10* (2006.01)
*G07F 7/12* (2006.01)

(52) U.S. Cl.
CPC ........... *G06Q 20/40* (2013.01); *G06Q 20/401* (2013.01); *G06Q 20/4016* (2013.01); *G07F 7/1075* (2013.01); *G07F 7/125* (2013.01); *H04L 63/12* (2013.01)

(56) References Cited

U.S. PATENT DOCUMENTS

| | | |
|---|---|---|
| 6,175,922 B1 | 1/2001 | Wang |
| 6,332,192 B1 | 12/2001 | Manza et al. |
| 6,607,136 B1 | 8/2003 | Atsmon et al. |
| 6,654,890 B1 | 11/2003 | Girard |
| 6,905,072 B2 | 6/2005 | Ramachandran |
| 6,937,731 B2 | 8/2005 | Chiu |
| 7,016,875 B1 | 3/2006 | Steele et al. |
| 7,155,739 B2 | 12/2006 | Bari et al. |
| 7,506,818 B2 | 3/2009 | Beenau et al. |
| 8,001,055 B2 | 8/2011 | Weiss |
| 2002/0023215 A1* | 2/2002 | Wang .................... G06Q 20/00 713/171 |
| 2002/0029342 A1* | 3/2002 | Keech ................... G06Q 20/382 713/184 |
| 2003/0191945 A1 | 10/2003 | Keech |
| 2004/0098350 A1 | 5/2004 | Labrou et al. |
| 2004/0107170 A1 | 6/2004 | Labrou et al. |
| 2004/0172535 A1 | 9/2004 | Jakobsson et al. |
| 2005/0027543 A1 | 2/2005 | Labrou et al. |
| 2005/0109838 A1 | 5/2005 | Linlor |
| 2005/0132003 A1 | 6/2005 | Philyaw |
| 2006/0069922 A1* | 3/2006 | Jelinek ................ H04L 63/0823 713/186 |
| 2006/0131390 A1 | 6/2006 | Kim |
| 2006/0144925 A1 | 7/2006 | Jones |
| 2007/0111713 A1 | 5/2007 | Silverbrook et al. |
| 2007/0156436 A1* | 7/2007 | Fisher .................. G06Q 20/401 455/552.1 |
| 2007/0295801 A1 | 12/2007 | Harris |
| 2008/0067229 A1 | 3/2008 | Iwayama et al. |
| 2008/0077532 A1 | 3/2008 | Von Heesen et al. |
| 2008/0257956 A1 | 10/2008 | Grannan et al. |

* cited by examiner

METHOD AND DEVICE FOR END-USER VERIFICATION OF AN ELECTRONIC TRANSACTION This application is a Continuation application of prior U.S. patent application Ser. No. 14/635,624 filed Mar. 2, 2015, which is a Continuation application of prior U.S. patent application Ser. No. 12/072,739 filed Feb. 28, 2008 and issued on Mar. 31, 2015 as U.S. Pat. No. 8,996,867, the disclosures of which are herein incorporated by reference in their entirety.

BACKGROUND

A traditional transaction between a consumer and a merchant involves two parties. Each party can view the other and verify one another's credibility. However, in electronic commerce the transaction becomes more complex. The merchant is now represented by a complex and multi-component system comprising such parts as databases, web pages, credit card processing, and authentication schemes. The consumer is now an end-user interacting not with the merchant, but with his computing device.

Since the merchant in an e-commerce scenario interacts only with a computing device of the end-user and does not have "face to face" contact with the end-user, all end-user verification by the merchant must take place via the computing device of the end-user. Hence, the most the merchant can do regarding security of an online transaction is to use digital security mechanisms such as Secure Socket Layer (SSL) to establish security and build a trust relationship with the computing device.

However, such digital security mechanisms do not establish any trust relationship between the merchant and the customer. A prior art solution to this problem is to rely on a customer account login process. In this manner, the particular knowledge (i.e., password) that the customer has, establishes his identity with the merchant. However, passwords can be stolen and illegitimate transactions might be processed.

Often, it is difficult in mobile and handheld devices, such as those used in M-commerce scenarios (i.e. commerce using a mobile device), to provide a login process, because these devices lack the traditional human-computer interface such as a full keyboard. Hence, M-commerce systems often switch to a different prior art solution to verify the identity of the end-user. This solution is to presume that there is a security binding between the customer and his purchasing device. The purchasing device has specific data associated with it that can be recognized and verified by an M-Commerce system. For example, when a cellular phone is used, a particular set of information is transmitted identifying the cellular phone, and any transaction coming from the purchasing device is accepted as originating from the owner of the device.

This model also has drawbacks. Mobile devices are becoming more and more sophisticated and include a variety of features and, often, multiple communication channels. If one of these communication channels is hijacked, the communication can be intercepted or duplicated to produce an illegitimate transaction. Still further, multi-mode devices have multiple communication interfaces. For example, one particularly popular example is an IEEE 802.11 (Wi-Fi) and cellular dual-mode phone. The architectural designs of these multi-mode mobile devices often do not separate applications for different connections; the intention is to support "seamlessness" while the device switches communication technologies. It now becomes possible for an attacker to hijack an application running on a mobile device via, for example, the Wi-Fi interface. The attacker can now launch purchasing requests from the same application using M-commerce channels and take advantage of the trust between the merchant and the computing device of the end-user. From the M-commerce merchant perspective, such transactions appear legitimate because the transaction comes from the recognized device.

Since there is no "face to face" contact between a merchant and a consumer in electronic commerce, a weak point exists. Hijackers of computer systems and electronic commerce can take advantage of this weak point to carry out fraudulent transactions.

The prior art solutions of recognizing a device, or having the end-user, the consumer, enter a password, have limitations. Thus, an improved method of verifying that a transaction is legitimate is needed.

SUMMARY

The present invention allows the owner of a device to verify the legitimacy of the transaction before allowing the transaction to be completed. This invention is especially useful in connection with handheld network devices such as those used in M-commerce. Separate and specific communication channels and/or memory spaces are used in allowing or disallowing the transaction. The separate channel is typically secure, and code used for the verification process is typically also stored in a secure memory space, separate from code used for the transaction. When security of part of the device has been compromised, the rightful owner of the device can prevent a fraudulent transaction because the verification process is secure in a separate channel and/or memory space.

A method of the invention proceeds by first interrupting an electronic communication before completion of a transaction. Information related to the transaction is made part of a transaction identification string (TID) and displayed or exhibited to an end-user. The end-user then confirms or denies the transaction, which either allows or cancels the transaction. In order to ensure that the verification process is secure, code used in the method of the invention is typically executed in a separate and protected memory space, such as kernel space, a separate processor core, or a separate processor-memory environment. The separate memory space may be a SIM card of a cellular phone.

The TID is typically readable by the user and comprises information about the transaction, such as the name of a merchant, the product to be purchased, or the price to be paid. The TID may also comprise a nonce string. The nonce string is generated using a Diffie-Hellman exchange between the end-user's device and the party with which the end-user is transacting.

The step of displaying or otherwise exhibiting the TID and the step of receiving input from the end-user may be carried out on the same input/output channel or separate input/output channels. A short-range communication method such as Bluetooth may be used to transmit and display the TID and receive the response from the end-user. Further, the end-user's identity may be authenticated with a server, and such authentication may comprise authentication using biometric data.

A device of the invention is capable of interrupting an electronic communication until end-user approval is received. The device comprises a first memory space. Data in the first memory space comprises the electronic communication. A second memory space comprises code used to interrupt the electronic communication. The device also comprises a display for exhibiting a TID to an end-user. Upon receiving end-user input, the device of the invention carries out an action requested by the end-user.

The requested action of the end-user can be a request to cancel the transaction. The requested action can also be a request to allow the transaction.

The second memory space is typically a secure memory space such as a separate kernel space, a separate processor core, or a separate processor-memory environment.

DETAILED DESCRIPTION

Figure 1:
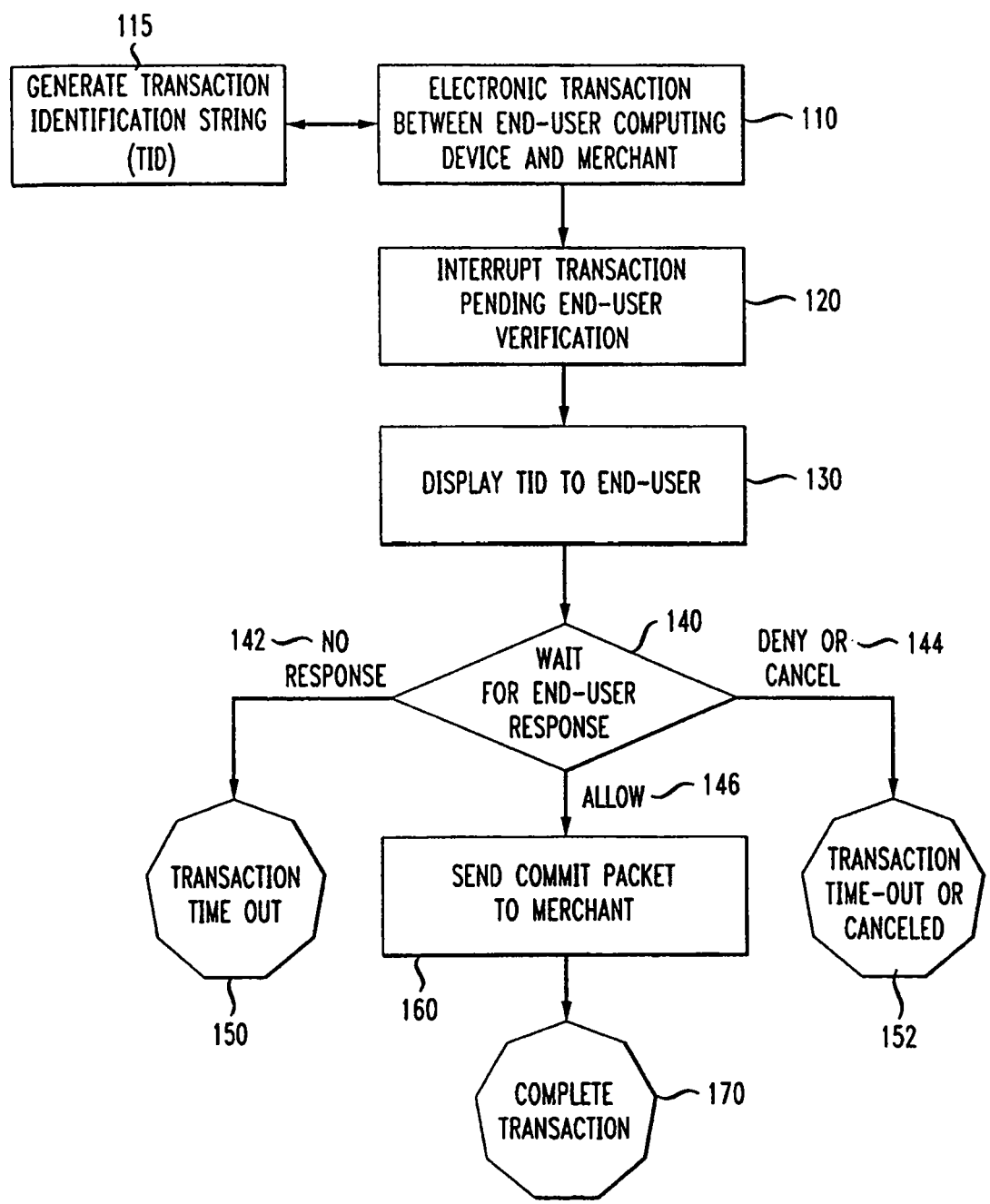
FIG. 1 shows an embodiment of a method of the invention wherein an electronic transaction is verified by an end-user before completion.

Modern computer operating systems such as UNIX and UNIX-like systems separate kernel space from application space. Typically, when a system has been "hijacked," only a portion of the system has actually been compromised. For example, when a hijacker successfully hijacks the browser application, such as through the use of a Trojan horse or spy-ware, the hijacker can drive the browser to do things such as going to certain web sites, but the browser, even when compromised, can only act in accordance with permission granted to it by the operating system. In particular, in UNIX and UNIX-like operating systems, the browser acts within application space granted to it by the operating system. For example, the browser could write or delete a file from its own cache but could not write or delete a file associated with another application or another user. Still further, higher-level functions are typically run in a protected memory space which is not accessible by the browser. This may be kernel space. In many computing environments, only higher layers of an operating system access the kernel space and, from there, the operating system can conduct such functions as killing a running process, overwriting protected files, and so forth.

The present invention provides methods and apparatuses for verifying the legitimacy of a transaction. The methods and apparatuses use separate memory space that may be a separate application memory space or protected memory space, e.g., kernel space of an operating system or a separate memory unit from the application space such as is available on a SIM card of a cellular phone. The method of the invention proceeds by creating a transaction identification string (TID) and associating the TID with a transaction. The TID contains data relevant to or associated with the transaction and is typically readable by an end-user. The transaction is then interrupted until a user responds in the affirmative to allow completion of the transaction. Methods and devices used in the invention are particularly suitable for M-commerce, where transactions originating from a device are typically recognized by a merchant as coming from the owner of the device without further authentication.

The methods and apparatuses that can be used in one of many embodiments of the invention will become clearer from the detailed description provided below.

The embodiments of the invention are best understood by understanding the transaction identification string (TID) of the invention. The TID is a unique string for each transaction that has been negotiated between a merchant and a computing device of an end-user device, such as a personal digital assistant, handheld computer, cellular phone, or personal computer. The merchant is the seller of goods or services in communication with the computing device of an end-user, typically via a network connection such as the Iinternet. The merchant is typically an electronic merchant and typically provides data for display on the computer device of the end-user representative of the goods or services for sale.

Figure 2:
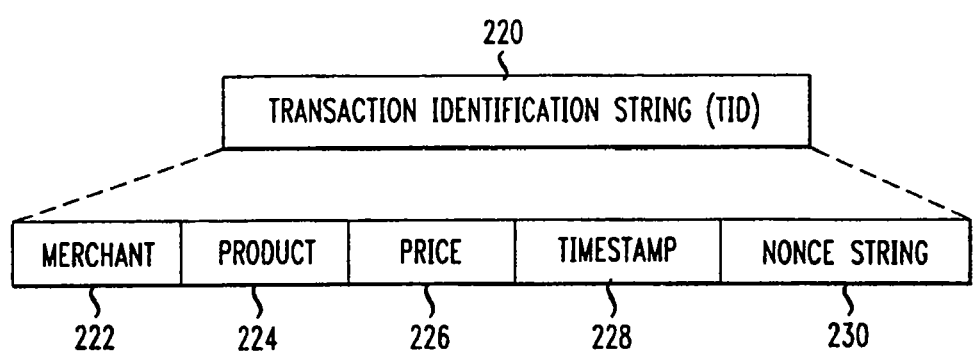
FIG. 2 shows the elements that comprise a transaction identification string (TID) as used in embodiments of the invention.

Referring now to FIG. 2, this Figure shows the elements that comprise a transaction identification string (TID) as used in embodiments of the invention. The TID 220 comprises various elements relating to the transaction underway. The TID is typically user readable, but may be any series of codes, whether readable by a human end-user or otherwise. In an embodiment of the invention, the TID 220 comprises the name of or text identifying the merchant 222, followed by a product description 224 to be ordered, the price 226 or cost of the item to be ordered, a time stamp 228 as to when the transaction has been ordered or will take place, and a nonce string 230. Each element of the TID may be stored in any order as desired for the specific configuration, and each element may be separated from any other by any reasonable means known in the art, including a "tab" character, a comma, a semicolon, a slash or backslash, or by designating a fixed amount of space for each element of the TID, such as 255 characters.

Describing each of the elements of the TID 220 of the present embodiment of the invention in more detail, the merchant 222 portion of the TID is typically the name of the merchant. For example, this portion of the string may read "AT&T Store," "Amazon.com," or "B&H Photo." In one embodiment of the invention, the name of the store matches the name that will appear on a credit card bill, bank statement, or phone bill to help an end-user recognize the transaction when the transaction appears on such a statement. The name of the merchant may also comprise a merchant identification number.

The product description 224 may comprise a title or description of a single product being ordered, the first of a series of products being ordered, or an amalgam of various products being ordered. Thus, depending on the level of security desired, in a transaction with many products being ordered, a separate TID 220 will be created for each product description 224. The price 226, or the total amount to be billed relevant for each product description 224 being ordered, or the amalgam of products being ordered will be displayed. It should be clear to one having ordinary skill in the art that, depending on the particular implementation of the method of the invention, the data which comprises the sections of the display, i.e., the product 224 and price 226, will vary and will generally be related to one another.

In the present embodiment of the invention, a nonce string 230 is included in the TID 220. The nonce string 230 is a secure string generated by the merchant and the computing device of the end-user such as by using a Diffie-Hellman exchange. The Diffie-Hellman key agreement protocol (also called exponential key agreement) was developed by Diffie and Hellman in 1976 and published in the ground-breaking paper "New Directions in Cryptography." (W. Diffie and M. E. Hellman, "New directions in cryptography," *IEEE Transactions on Information Theory* 22 (1976), 644-654). The publication is herein incorporated by reference. The protocol allows two users to exchange a secret key over an unsecured medium without any prior secret information. The application of the TID in the present application will become clearer in the forthcoming paragraphs describing the methods and apparatuses used in the invention.

FIG. 1 shows an embodiment of a method of the invention wherein an electronic transaction is verified by an end-user before completion. In this embodiment of the invention, in step 110 an electronic transaction is taking place on an end-user device. In step 115, a transaction identification string (TID) is generated. At a time before completion of the transaction, and typically just before final completion of the transaction, the transaction is interrupted in step 120 pending end-user verification. When the transaction is interrupted, the end-user device does not permit further communication with the merchant until the end-user indicates to the end-user device that the transaction should be accepted or denied. The disallowance of further communication with the merchant may be accomplished by refusing a connection with the merchant based on identifying information about the merchant. Such identifying information may include the merchant IP address, SSL certification, or other location or security-related information. As shown in the figure, step 115 occurs concurrently with step 110. However, embodiments of the invention are contemplated wherein the TID is generated at any time prior to step 130 such as just before step 130, concurrently with step 120, or just before step 120.

In step 130, the TID is displayed to an end-user. In an alternative embodiment of the invention, instead of displaying a TID, the TID is provided to the user via audible means, such as text-to-speech synthesis. In another alternative embodiment of the invention, step 130 is replaced with a step of merely signaling the user that verification of a transaction is necessary. This may be via audible or visual means and may be conducted via short-range wireless technology, such as via a Bluetooth handset.

In step 140, devices of the invention and/or the merchant at the other end of the electronic transaction of step 110 wait for an end-user response. The end-user may choose to deny or cancel the electronic transaction in path 144. If the user denies or cancels the transaction in path 144, then the transaction will time out or be cancelled in step 152. A time out will occur when a specified period of time has elapsed without a response indicating that the transaction should continue. Thus, the transaction will not be allowed to complete. However, typically, when a user denies or cancels the transaction in path 144, the transaction will be cancelled in step 152 and thus not be allowed to complete. If there is no end-user response within a specified time frame, such as 30 seconds, 1 minute, or 5 minutes, then path 142 will be triggered and the transaction will time out in step 150.

However, if the end-user indicates that he or she wishes to allow the transaction to take place in path 146, then a "commit" packet will be sent to the merchant in step 160 and the transaction will be completed or executed in step 170. The commit packet contains, in addition to the TID, a separate standardized "marker string" (such as the ASCII string "M-Commerce Secure Commit™") at a standard offset (such as at the beginning of the packet). The commit packet is cryptographically signed by the computing device of the end-user and typically uses services provided in a secure memory area of the computing devices, such as in a SIM card. The signature is computed over at least the marker string and the TID.

Thus, the method of the present embodiment of the invention has the following desirable characteristics: (1) the commit packets cannot be forged, because of the cryptographic signature; (2) commit packets cannot be pre-computed or replayed, due to the nonce string; (3) the end-user can verify that the desired transaction is being approved, by reading the TID; (4) commit packets are easily recognizable, due to the presence of the marker string, so a rogue application cannot trick the device into sending a commit packet without the user's knowledge; (5) the transaction will not be completed until the merchant has verified that an end-user wants to complete the transaction and a commit packet is received.

Figure 3:
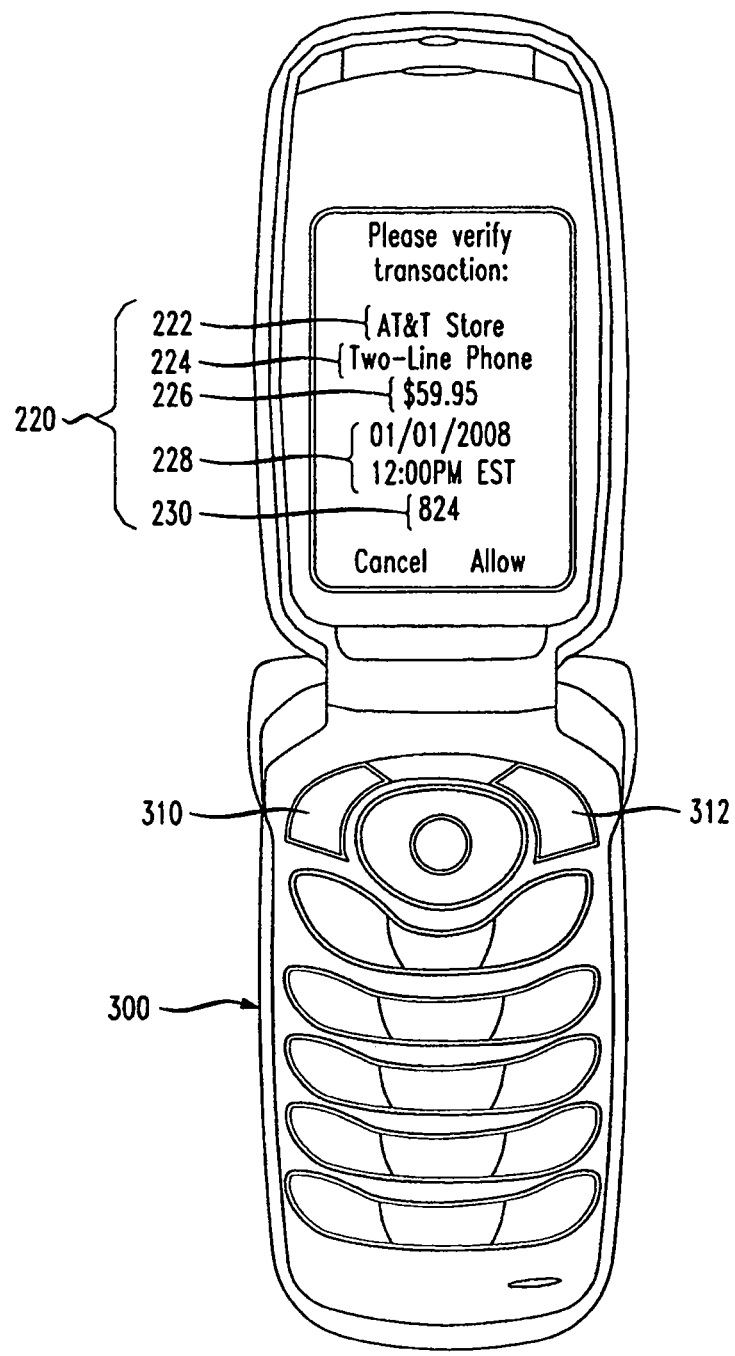
FIG. 3 shows a device on which an embodiment of the invention may be carried out.

FIG. 3 shows a device on which an embodiment of the invention may be carried out. Elements of the TID 220 are numbered in accordance with the numbers of FIG. 2. The device 300 depicted is a typical cellular phone; however, the device 300 may be any device capable of handling electronic commerce, such as a cellular phone, personal digital assistant, laptop computer, desktop computer, and the like. The display of the device 300 is used to exhibit the TID 220. In the example shown in FIG. 3, the merchant 222 is "AT&T Store," the product name 224 is "Two-Line Phone," the price 226 is "$59.95," the time stamp 228 is displayed as "Jan. 1, 2008, 12:00 PM EST," and the nonce string 230 is "824." The nonce string can also be used by the end-user as a type of verification code. The device 300 also comprises an "allow button" 312 and a "cancel button" 310. The end-user presses the desired button. Upon depressing the cancel button 310, path 144 is followed and step 152 is carried out (as shown in FIG. 1), wherein the transaction is cancelled. Upon depressing the "allow" button 312, path 146 is followed and step 160 is carried out (as shown in FIG. 1), wherein a commit packet is sent to the merchant and the transaction is completed.

Figure 4:
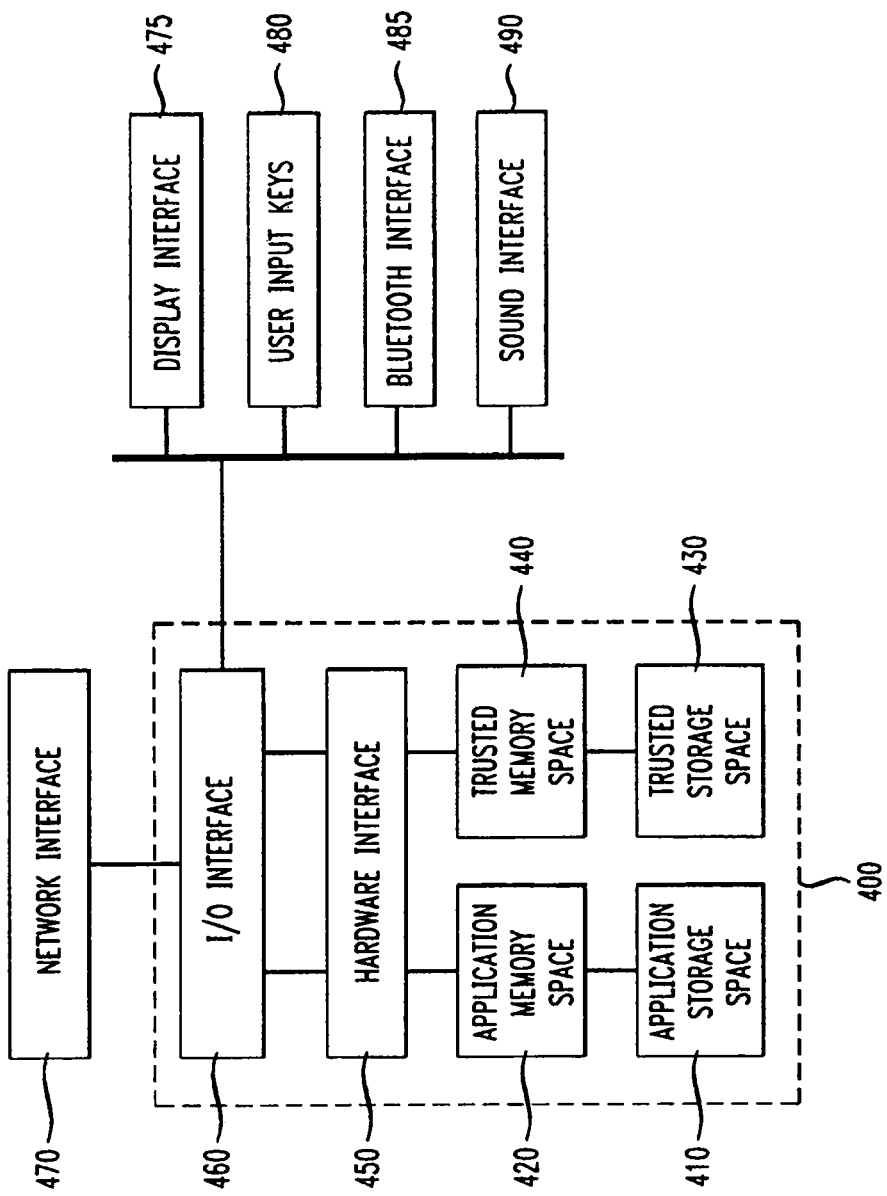
FIG. 4 is a high level representation of a device on which an embodiment of the invention may be carried out.

FIG. 4 is a high level representation of a device on which an embodiment of the invention may be carried out. The device of FIG. 3 may function on a system shown in FIG. 4. It will be appreciated by one skilled in the art that further devices, peripherals, and elements of device 400 are contemplated as part of the scope and spirit of the invention. Each element of device 400 and the surrounding peripherals may be comprised of one or more elements. Thus, application memory space 420 may comprise multiple application memory spaces and so forth.

The device 400 of this embodiment comprises application storage space 410 and trusted storage space 430. Applications stored in the application storage space 410 are executed in application memory space 420. Applications, functions, and the like, which are stored in the trusted storage space 430, are executed in the trusted memory space 440. Such storage and memory spaces are generally known in the art and may include RAM, ROM, magnetic media, optical media, solid state memory such as flash memory, and the like. Depending on system architecture, threat level, and the level of security required, the trusted storage space 430, as well as the trusted memory space 440, may be a protected hardware or operating system. Such protection limits access either directly by the hardware, or access via the operating system only. Such trusted or protected space may be the kernel space of the operating system running on the device 400, a separated processor core, or a separate processor-memory environment, such as that of an embedded system that operates peripherals. An application, such as is used in electronic commerce to display and order goods or services, is run in the application space 420. Such an application may be a web browser. However, the method steps of generating a transaction identification string, interrupting a transaction, displaying the TID to an end-user, and allowing (continuing) or disallowing (aborting) a transaction, are typically conducted in the trusted memory space 440. Code used for such steps is typically stored in the trusted memory storage space 430. However, any combination of the above is contemplated and is within the scope of the invention.

In one embodiment of the invention, depicted in FIG. 4, the invention is carried out on a mobile device that comprises a SIM card, the mobile device, and the SIM-run separate kernels. The SIM is more secure than the general application space of most mobile devices, making it the appropriate place to store sensitive data such as keys, and to perform sensitive tasks such as cryptographic signature. However, the SIM card has limited I/O capability and cannot typically drive a display of a mobile device. Therefore, when such a device is used to carry out the method of the invention, the steps of generating the TID and commit packets are handled in a kernel space on the SIM card. Other steps described above typically are handled in the application memory space 420, a second application space 420 (which provides some security in that it is a separate application space from that of the first application) or in a trusted memory space 440.

Referring again to FIG. 4, the application memory space 420 and trusted memory space 440 exchange data either directly or through other processes and devices with a hardware interface 450. The hardware interface exchanges data directly or through other processes and devices with an Input/Output interface 460. The I/O interface 460 exchanges data with components of the hardware, such as a network interface 470, a display interface 475, user input keys 480, a Bluetooth interface 485, and a sound interface 490. Depending on the specific embodiment of the invention, selected devices are used. For example, in one embodiment user input keys 480 are used to receive input from a user as to whether to allow or cancel the transaction (such as is depicted in FIG. 3). However, when a touch screen device is used, "allow" and "cancel" images "buttons will be displayed on the display interface 475. It may also be desired to signal an end-user for verification of the transaction via a short-range wireless device such as IEEE 802.15.1 (Bluetooth), 802.11 (Wi-Fi), or 802.15.4 (Zigbee). As such, the Bluetooth interface will be responsible for sending the TID to a handset and for receiving an "allow" or "cancel" input from a user.

In each of the above embodiments, the sending of the TID and receiving of a response from an end-user can be accomplished over a single I/O channel. However, for added security, it may be desired to send the TID over one I/O channel and receive the end-user response over a second I/O channel. This would allow for extra security because such a channel might become compromised. For example, the TID may be sent to a display of a cellular phone via the display interface 475, but the end-user response may need to be received on an I/O channel via the Bluetooth interface 485 for maximal security.

In another embodiment of the invention, the separate memory space of the application is a separate application space within a larger application space comprising both the memory space of the application and the separate application space used to practice the present invention. This second and separate memory space is not necessarily a protected memory space as in previous embodiments, but is still separate from the application space and applications such as web browsers used to conduct the transaction. Thus, a web browser, even if hijacked, could not complete a transaction without also hijacking the present invention. When the threat level is fairly low, the separate application space will be enough protection to prevent intrusions. Even if the application used in the transaction may be hijacked, the code and application used to practice the invention would not be hijacked.

Figure 5:
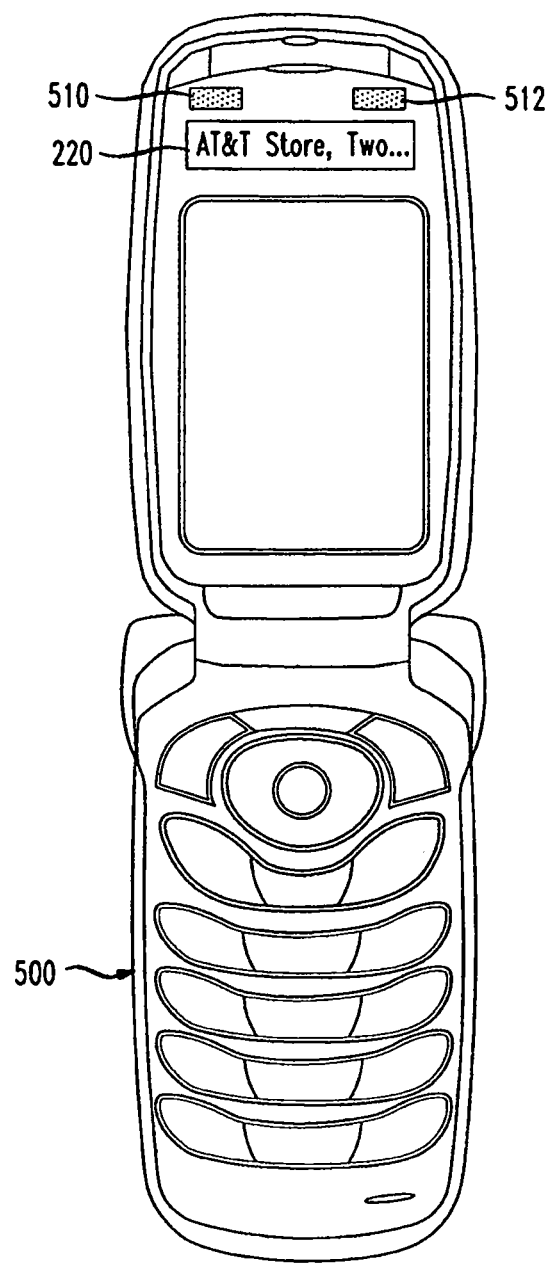
FIG. 5 shows a device on which an embodiment of the invention may be carried out.

FIG. 5 shows a device on which an embodiment of the invention may be carried out. The device 500, as depicted in FIG. 5, has dedicated buttons and dedicated I/O channels for displaying the TID 220 and receiving a response from an end-user. The "allow" button 512 is used to allow the transaction to be completed, and the "cancel" button 510 is used to deny or cancel the transaction. The dedicated I/O channels and separate buttons and/or display may be advantageous for the purpose of alerting the end-user of the seriousness of the verification process by having the user verify the transaction based on the use of a separate display and separate buttons. Further, the use of separate buttons and a separate display allows for the use of dedicated I/O channels, which are more secure than shared I/O channels where an application may also have access.

Figure 6:
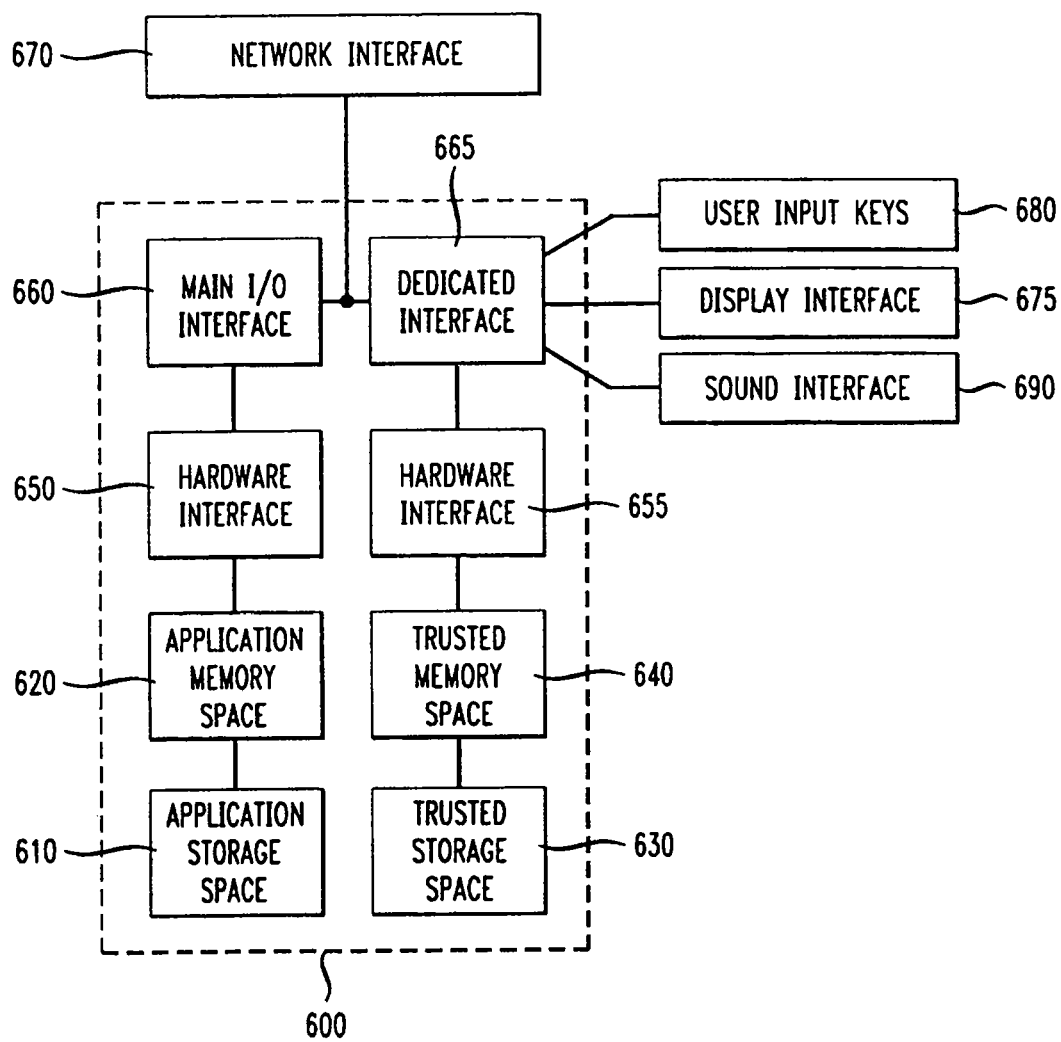
FIG. 6 is a high level representation of a device with dedicated I/O channels on which an embodiment of the invention may be carried out.

FIG. 6 is a high level representation of a device with dedicated I/O channels on which an embodiment of the invention may be carried out. The device of FIG. 5 may function on a system shown in FIG. 6. Elements of FIG. 6 that are similar to those of FIG. 4 have been incremented by 200. For example, application storage space 410 of FIG. 4 is application storage space 610 of FIG. 6. However, in FIG. 6, the application memory space 620 exchanges data or otherwise interacts with, hardware interface 650, whereas the trusted memory space 640 exchanges data or otherwise interacts with hardware interface 655. Additionally, a separate I/O interface 665 is provided for use with the hardware interface 655 that interacts with the trusted memory space 630. This is separated from the main I/O interface 660 on which commands are carried out from applications other than that of the verification steps of the present invention. However, both the main I/O interface 660 and dedicated interface 665 communicate with the network interface 670, and may communicate with each other depending on the threat level and desired security. Such communication may be useful so that the dedicated interface 665 can notify the main I/O interface 660 that a transaction has been detected and is being interrupted. Such detection may take place when a merchant asks for a commit packet to complete the transaction. While not depicted, the main I/O interface 660 is typically connected to a variety of peripherals, such as a display, user input keys, and the like.

In the embodiment of FIG. 6, the dedicated interface 665 is connected to dedicated devices used to carry out the verification of a transaction. These devices may include user input keys 680, a display interface 675, and a sound interface 690. The user input keys 680 typically communicate with a key used to allow the transaction to be completed and a key used to cancel or timeout the transaction. The TID is typically displayed on a dedicated display via the display interface 675. If desired, or instead of displaying the TID, there may be audio notification via the sound interface 690 to notify the end-user that a transaction must be verified.

Each communication with peripheral devices 670, 675, 680, 690, and further devices not shown in FIG. 6, may be via a single input/output channel or via a first channel for sending and a second channel for receiving.

Figure 7:
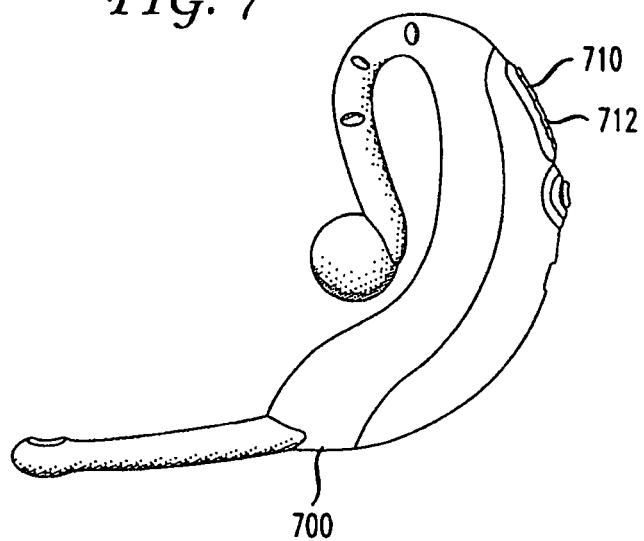
FIG. 7 shows a Bluetooth handset on which the invention may be carried out.

FIG. 7 shows a Bluetooth handset on which the invention may be carried out. Such a handset 700 typically includes an allow button 712 corresponding to allow button 312 of device 300 and a cancel or disallow button 710 corresponding to the button 310 of device 300.

Further, the verification process of the invention may be part of a larger authentication process with the merchant. For example, the authentication process may include biometric or other authentication of the customer to establish a direct security binding between the customer and the merchant.

Figure 8:
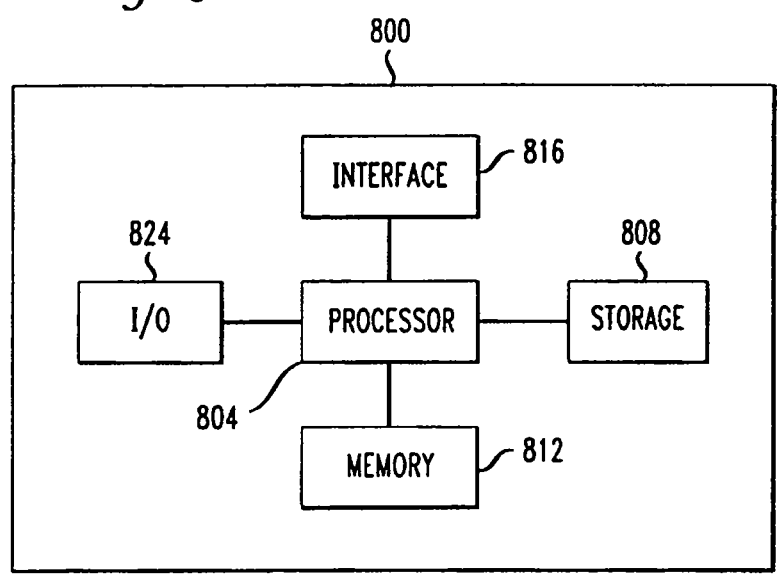
FIG. 8 shows a high level block diagram of a computer that may be used to carry out the invention.

FIG. 8 shows a high-level block diagram of a computer that may be used to carry out the invention. Computer 800 contains a processor 804 that controls the overall operation of the computer by executing computer program instructions which define such operation. The computer program instructions may be stored in a storage device 808 (e.g., magnetic disk, database) and loaded into memory 812 when execution of the computer program instructions is desired. Thus, the computer operation will be defined by computer program instructions stored in memory 812 and/or storage 808 and the computer will be controlled by processor 804 executing the computer program instructions. Computer 800 also includes one or input network interfaces for communicating with other devices via a network (e.g., the Internet). Computer 800 also includes one or more output network interfaces 816 for communicating with other devices. Computer 800 also includes input/output 824 that represent devices which allow for user interaction with the computer 800 (e.g., display, keyboard, mouse, speakers, buttons, etc.). One skilled in the art will recognize that an implementation of an actual computer will contain other components as well, and that FIG. 8 is a high level representation of some of the components of such a computer for illustrative purposes. It should also be understood by one skilled in the art that the method and devices depicted in FIGS. 1 through 7 may be implemented on a device such as is shown in FIG. 8.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A method comprising:
  creating, by a processing system including a processor, a unique transaction identification string in a processor and secure memory environment associated with and operationally separate from an end-user device, the transaction identification string negotiated among the end-user device, a merchant device, and the processor and secure memory environment and associated with a transaction between the end-user device and the merchant device, wherein the transaction identification string includes a nonce string, wherein communication between the processor and the end-user device is performed via secure communications comprising a first dedicated communication channel and a second dedicated communication channel;
  transmitting, by the processing system, interrupt instructions to the end-user device, the interrupt instructions causing the end-user device to interrupt an electronic communication between the end-user device and the merchant device before completion of the transaction, wherein the electronic communication is associated with the transaction, wherein in accordance with the interrupt instructions, the end-user device does not permit further communication with the merchant device until receipt of transaction instructions by the end-user device;
  transmitting, by the processing system, the transaction identification string and display instructions to the end-user device on the first dedicated communication channel, the display instructions causing the end-user device to display the transaction identification string; and
  transmitting, by the processing system, the transaction instructions to the end-user device on the second dedicated communication channel, based on user input received in response to displaying the transaction identification string.

2. The method of claim 1, wherein the transaction instructions comprise a cancellation instruction in response to user input requesting that the transaction be cancelled.

3. The method of claim 1, wherein the transaction instructions comprise a commit packet in response to user input indicating that the transaction is authorized.

4. The method of claim 3, further comprising:
  generating the commit packet, the commit packet comprising the transaction identification string; and
  encrypting the commit packet using a key stored in the processor and secure memory environment.

5. The method of claim 1, wherein the end-user device is a mobile device.

6. The method of claim 1, wherein the transaction identification string comprises transaction information.

7. The method of claim 6, wherein the transaction information comprises an identification of a merchant associated with the merchant device and a value pertaining to the transaction.

8. An apparatus comprising:
  a processor and secure memory environment associated with and operationally separate from an end-user device, the processor and secure memory environment comprising:
  the processor; and
  a memory in the secure memory environment to store computer program instructions, the computer program instructions when executed on the processor cause the processor to perform operations comprising:
  creating a unique transaction identification string in the secure memory environment, the transaction identification string negotiated among the end-user device, a merchant device, and the secure memory environment and associated with a transaction between the end-user device and the merchant device, wherein the transaction identification string includes a nonce string and wherein communication between the processor and the end-user device is performed via secure communications comprising a first dedicated communication channel and a second dedicated communication channel;
  transmitting interrupt instructions to the end-user device, the interrupt instructions causing the end-user device to interrupt an electronic communication between the end-user device and the merchant device before completion of the transaction, wherein the electronic communication is associated with the transaction, wherein in accordance with the interrupt instructions, the end-user device does not permit further communication with the merchant device until receipt of transaction instructions by the end-user device;

transmitting the transaction identification string and display instructions to the end-user device on the first dedicated communication channel, the display instructions causing the end-user device to display the transaction identification string; and transmitting transaction instructions to the end-user device on the second communication channel, based on user input received in response to displaying the transaction identification string.

9. The apparatus of claim 8, wherein the transaction instructions comprise a cancellation instruction in response to user input requesting that the transaction be cancelled.

10. The apparatus of claim 8, wherein the transaction instructions comprise a commit packet in response to user input indicating that the transaction is authorized.

11. The apparatus of claim 10, the operations further comprising:
generating the commit packet, the commit packet comprising the transaction identification string; and
encrypting the commit packet using a key stored in the processor and secure memory environment.

12. The apparatus of claim 8, wherein the end-user device is a mobile device.

13. The apparatus of claim 8, wherein the transaction identification string comprises transaction information.

14. The apparatus of claim 13, wherein the transaction information comprises an identification of a merchant associated with the merchant device and a value pertaining to the transaction.

15. A non-transitory machine readable medium comprising executable instructions that, when executed on a processor associated with a secure memory environment operationally separate from an end-user device, cause the processor to perform operations comprising:
creating a unique transaction identification string in the processor and secure memory environment associated with and separate from the end-user device, the transaction identification string negotiated among the end-user device, a merchant device, and the processor and memory environment and associated with a transaction between the end-user device and the merchant device, wherein the transaction identification string includes a nonce string, wherein communication between the processor and the end-user device is performed via secure communications comprising a first dedicated communication channel and a second dedicated communication channel;

transmitting interrupt instructions to the end-user device, the interrupt instructions causing the end-user device to interrupt an electronic communication between the end-user device and the merchant device before completion of the transaction, wherein the electronic communication is associated with the transaction, wherein in accordance with the interrupt instructions, the end-user device does not permit further communication with the merchant device until receipt of transaction instructions by the end-user device;

transmitting the transaction identification and display instructions to the end-user device on the first dedicated communication channel, the display instructions causing the end-user device to display the transaction identification string; and transmitting transaction instructions to the end-user device on the second dedicated communication channel, based on user input received in response to displaying the transaction identification string.

16. The non-transitory machine readable medium of claim 15, wherein the transaction instructions comprise a cancellation instruction in response to user input requesting that the transaction be cancelled.

17. The non-transitory machine readable medium of claim 15, wherein the transaction instructions comprise a commit packet in response to user input indicating that the transaction is authorized.

18. The non-transitory machine readable medium of claim 17, the operations further comprising:
generating the commit packet, the commit packet comprising the transaction identification string; and
encrypting the commit packet using a key stored in the processor and secure memory environment.

19. The non-transitory machine readable medium of claim 15, wherein the end-user device is a mobile device.

20. The non-transitory machine readable medium of claim 15, wherein the transaction identification string comprises transaction information.

* * * * *